May 16, 1933.　　　R. RÜDENBERG　　　1,909,125
LONG DISTANCE HIGH VOLTAGE POWER TRANSMISSION SYSTEMS
Filed Sept. 17, 1929
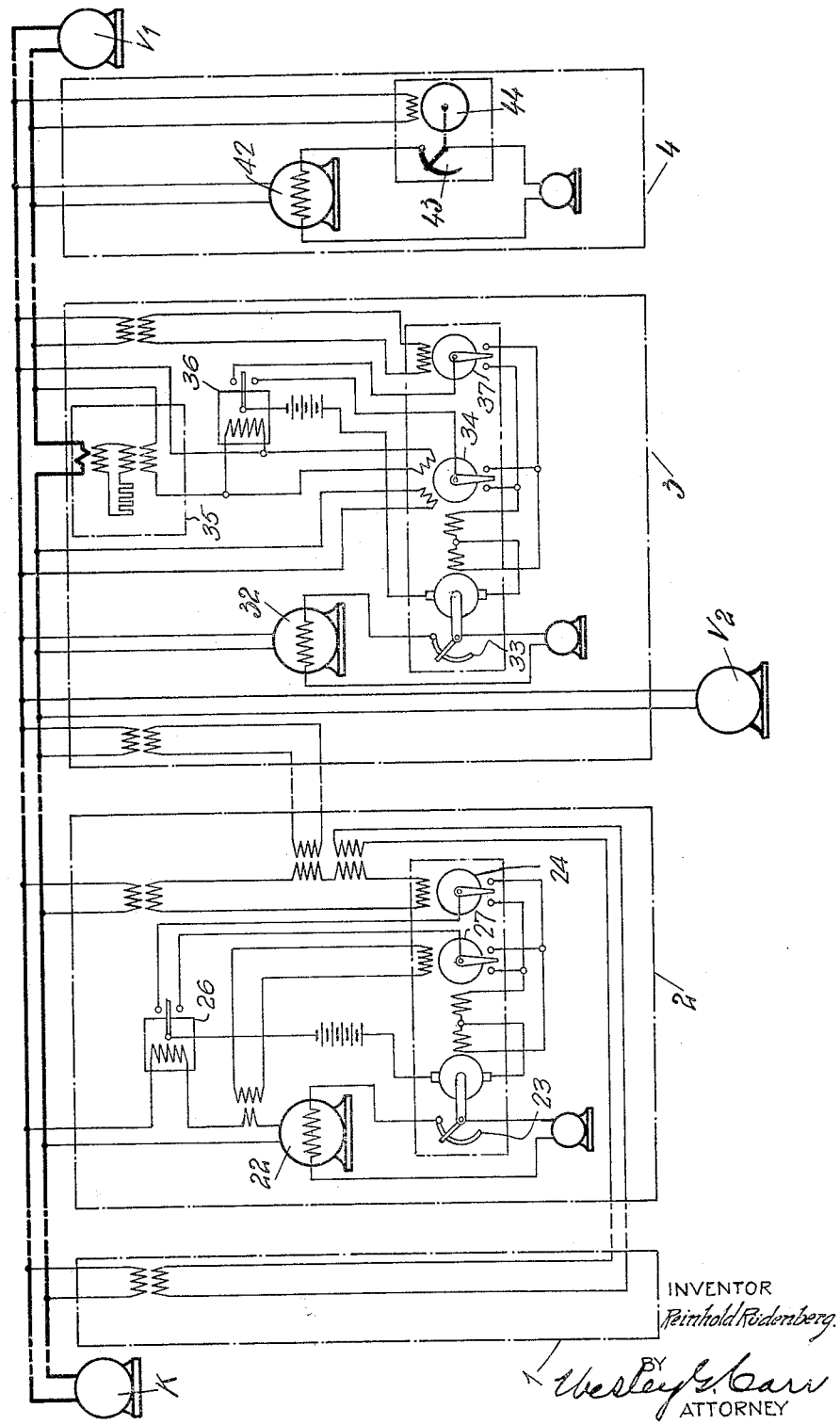
INVENTOR
Reinhold Rüdenberg.
BY
ATTORNEY Patented May 16, 1933

1,909,125

UNITED STATES PATENT OFFICE

REINHOLD RÜDENBERG, OF BERLIN-GRUNEWALD, GERMANY, ASSIGNOR TO WESTINGHOUSE ELECTRIC & MANUFACTURING COMPANY, A CORPORATION OF PENNSYLVANIA

LONG-DISTANCE HIGH-VOLTAGE POWER TRANSMISSION SYSTEMS

Application filed September 17, 1929, Serial No. 393,224, and in Germany September 20, 1928.

My invention relates to improvements in long-distance high-voltage power transmission systems, and more particularly in the voltage regulation of such systems.

It is well known that in long-distance lines considerable voltage fluctuations develop due to the great capacitance of the line. My invention is applicable to lines of such length and high voltage that the capacity of the line is considerable or sufficient to cause an appreciable voltage change along the line with changing load thereon.

The object of my invention is to avoid these voltage fluctuations.

According to my invention compensating devices such as synchronous machines are arranged along the transmission line, distributed at various stations, which compensators are adapted to be controlled not only by the electric values of the transmission line at their own station but also by the electric values of the line at other stations. By this arrangement working in opposition, hunting and detrimental reregulation of the compensators of a plurality of stations may be avoided if a voltage regulation takes place in any or in a plurality of stations. The compensators may, according to my invention, be controlled by regulators or measuring instruments which respond to the "sum" of the system voltages of individual stations. By "sum" is to be understood not only the sum but also the difference, because the voltages may act upon the regulator in the same direction or in the opposite direction. Which of the two is chosen depends upon the special regulators and controllers, whether, for instance, it is a regulating action which originates from the voltage or the reactive or active current of the line or compensator.

The system voltages of individual stations should act upon the regulator at a given station in varying degrees so that the system voltage of a given station acts upon the regulator apportioned to it more strongly than the system voltages of other stations. Thus, for instance, the regulator could be affected by the system voltage of its own station to the full power, while the two adjacent stations affect the regulator to half the power of the system voltages.

Preferably the regulator may be controlled by the difference of the system voltage of a given station and the system voltages of other stations, for instance one or both of the adjacent stations. If the voltage of a given station is designated with $E_n$, that of the adjacent stations with $E_{n+1}$ or $E_{n-1}$ respectively, the regulators regulate according to my invention in the first case preferably to $E_{n+1} - E_n = 0$ or $E_n - E_{n-1} = 0$ respectively, in the second case on the other hand preferably to $E_{n+1} + E_{n-1} - 2 E_n = 0$. In the latter case the voltage would be regulated to the arithmetical mean value of two adjacent stations. This has the great advantage that one is independent of the direction of the energy in the line so that the regulators function correctly at any direction of the energy. It will be understood that the regulators could be controlled only by the difference of the system voltages of two adjacent stations while the system voltage of the given station is not allowed to act on its regulators.

The last named regulating action requires, at some point of the line, a regulator which keeps constant an adjustable voltage value. This fixed voltage point of the line may be located at any desired point of the line, preferably at the consumer end or also, for instance if the power transmitted changes in direction, at the middle of the line. In case that the regulators adjust the voltage of a given station to the arithmetical mean value of the voltages of the adjacent stations two fixed voltage points will preferably be provided at the beginning and the end of the power transmission system in order to obtain an equal voltage along the entire line.

In case of failure of a regulator or a compensator it might happen that the comparison voltage for one of the stations to be regulated, for instance that of the adjacent station in the direction towards the fixed point of the voltage, rises or drops to an impermissible extent. According to my invention provision is made for this case that when a tolerance range for the effective value of the comparison voltage is exceeded or not reached the station to be regulated is regulated independently of the comparison voltage, or at a definite voltage value until the comparison voltage is again within the comparison voltage tolerance range.

Instead of letting the regulators be affected by the system voltages of individual stations, the controlling instruments may, according to my invention be controlled by the currents prevailing at the various stations, power outputs, phase displacements, or the inductance or capacitance of the lines at the individual stations.

To avoid overloading of the compensators they may also be provided with protecting devices so that from a certain reactive current strength upward the compensators themselves effect the limitation of the reactive current. For this purpose the compensators of a station hitherto controlled by, for instance, the sum of the system voltages, are, when the reactive current rises to a definite value, no longer controlled by these values but are so controlled as to limit the reactive currents of the station.

To avoid unnecessary control lines from station to station a model of the system is according to my invention used at each station which permits values proportional to the various electrical line values to be picked up. It will be understood that for the transmission of the effective current and voltage values of fairly remote stations all the principles known in communication engineering may be applied.

My invention is diagrammatically illustrated in the drawing affixed to my specification. In the single figure of the drawing it will be observed that along the transmission line issuing from the power station K there are distributed stations 1, 2, 3, 4 which contain compensators. To this line are connected the load consumers $V_1$ and $V_2$. The compensator of the station 4 consists of a synchronous machine 42 connected in parallel to the system and provided with a direct current field excitation circuit that is adapted to be regulated by the rheostat 43. The rheostat 43 is in known manner controlled by a regulating relay 44 controlled by the system voltage at this station.

The regulator or regulating relay is adapted to keep the voltage at this station constant so that at this station there exists a fixed voltage point on the line. It will be understood, however, that the regulation for constant voltage may also be obtained by means of other suitable apparatus. The compensating apparatus of the station 2 consists of the synchronous machine 22 connected in parallel to the system and the direct current excitation of which may be regulated by the rheostat 23. The rheostat 23 is, in the embodiment illustrated by way of example, in known manner operated by an electric motor controlled by a relay 24 which is affected by the system voltage of this station and by the system voltage of the two adjacent stations. Instead of letting the relay be affected by the system voltage of these stations it may be controlled by the system currents or any other electrical quantity of the line at these stations. 26 is a protective relay controlled by the reactive current of the synchronous machine 22. When the reactive current rises beyond a definite value this relay disconnects the regulator 24 and connects the regulator 27 in circuit so that the machine is now regulated at a constant reactive current.

The compensating apparatus of the station 3 consits of a synchronous machine 32 connected in parallel to the system and its direct current excitation is adapted to be regulated by the rheostat 33. The rheostat 33 is in known manner controlled by a differential relay 34 which is affected by the difference of the system voltage of the station 3 and an adjacent station. The system voltage of the adjacent station is not directly taken from it but obtained artificially by a line drop compensator or model of the system 35 in a manner well known in the art. In this way the difference of the voltages of two neighboring stations only may also be allowed to act on the measuring instrument of the intermediate station. If the voltage of the neighboring station which is fed to the protective relay 36 falls beyond the tolerance range the relay 36 connects the regulator 37 in circuit instead of the regulator 34 so that the machine is now regulated at constant voltage. Instead of comparing the voltages with one another the currents of different stations may act upon one another in a regulator. In principle the arrangement remains the same.

I claim as my invention:

1. A power transmission system comprising at least one source of alternating current, a transmission line connected to said source of alternating current, power consuming devices connected to said transmission line, stations containing compensating devices distributed at various points along said transmission line, regulators for said compensating devices, said regulators being controlled by means responsive to the sum of the system voltages at selected individual stations.

2. A long-distance high-voltage power transmission system comprising at least one source of alternating current, a transmission line connected to said source of alternating current, power consuming devices connected to said transmission line, stations containing compensating devices distributed at various points along said transmission line, regulators for said compensating devices responsive to the system voltage at a plurality of stations, said regulators being so adjusted as to be more strongly controlled by the system voltage of the coordinated station than by the system voltage of other stations.

3. A power transmission system comprising at least one source of alternating current, a transmission line connected to said source of alternating current, power consuming devices connected to said transmission line, stations containing compensating devices distributed at various points along said line, regulators for said compensating devices, means for controlling said regulators by the system voltage of their associated station and by the system voltage of an adjacent station.

4. A power transmission system comprising at least one source of alternating current, a transmission line connected to said source of alternating current, power consuming devices connected to said transmission line, stations containing compensating devices distributed at various points along said line, regulators for said compensating devices, means for controlling said regulators by the system voltage of their associated station and by the system voltage of the two adjacent stations.

5. A power transmission system comprising at least one source of alternating current, a transmission line connected to said source of alternating current, power consuming devices connected to said transmission line, stations containing compensating devices distributed at various points along said line, regulators for said compensating devices, means for controlling said regulators by the system voltages of the two adjacent stations.

6. A long-distance high-voltage power transmission system comprising at least one source of alternating current, a transmission line connected to said source of alternating current, power consuming devices connected to said transmission line, stations containing compensating devices distributed at various points along said transmission line, regulators for said compensating devices, means for controlling said regulators in accordance with the difference of the system voltages of the two adjacent stations to regulate for equal active values of the system voltages.

7. A long-distance high-voltage power transmission system comprising at least one source of alternating current, a transmission line connected to said source of alternating current, power consuming devices connected to said transmission line, stations containing compensating devices distributed at various points along said transmission line, regulators for said compensating devices, means for controlling said regulators in accordance with the difference of the system voltages of the two adjacent stations and protective devices so constructed that when the tolerance range for the active value of the comparison voltage of a station to be regulated is exceeded or not reached the compensating device is so controlled that the regulating station is regulated to a definite voltage value.

8. A long-distance high-voltage power transmission system comprising at least one source of alternating current, a transmission line connected to said source of alternating current, power consuming devices connected to said transmission line, stations containing compensating devices distributed at various points along said line, means for controlling said compensating devices in accordance with the voltage of said transmission line at their associated station and the voltage of said transmission line at other stations, and models of the system at each station, said models being so designed as to reproduce the line voltages of the other stations.

9. A power transmission system comprising at least one source of alternating current, a transmission line connected to said source of alternating current, power consuming devices connected to said transmission line, stations containing compensating devices distributed at various points along said line, and means for controlling said compensating devices in accordance with a component of the electric energy in the transmission line at their associated stations and also at other stations.

10. A power transmission system comprising at least one source of alternating current, a transmission line connected to said source of alternating current, power consuming devices connected to said transmission line, stations containing compensating devices distributed at various points along said transmission line, regulators for said compensating devices, and means for controlling said regulators in accordance with the sum of components of the electric energy in the transmission line at different individual stations.

11. A long-distance high-voltage power transmission system comprising at least one source of alternating current, a transmission line connected to said source of alternating current, power consuming devices connected to said transmission line, stations containing compensating devices distributed at various points along said transmission line, regulators for said compensating devices, and means for controlling said regulators in accordance with a component of the electric energy of the line at their associated station and at an adjacent station.

12. A long-distance high-voltage power transmission system comprising at least one source of alternating current, a transmission line connected to said source of alternating current, power consuming devices connected to said transmission line, stations containing compensating devices distributed at various points along said transmission line, regulators for said compensating devices, and means for controlling said regulators in accordance with a component of electric energy of the line at their associated station and at the two adjacent stations.

13. A long-distance high-voltage power transmission system comprising at least one source of alternating current, a transmission line connected to said source of alternating current, power consuming devices connected to said long-distance line, stations containing compensating devices distributed at various points along said line, means for controlling said compensating devices in accordance with a component of the electric energy of said transmission line at their associated station and in accordance with a component of the electric energy of said transmission line at other stations, and protective devices associated with said compensating devices, said protective devices being adapted to prevent an overloading of said compensating devices.

In testimony whereof, I have hereunto subscribed my name this 29th day of August, 1929.

REINHOLD RÜDENBERG.